United States Patent [19]
Pettey

[11] Patent Number: 6,105,762
[45] Date of Patent: Aug. 22, 2000

[54] COMPACT DISC FOLDER BOOKLET WITH DISC RETENTION MEANS

[75] Inventor: Thomas J. Pettey, Wayne, Ill.

[73] Assignee: White Thorn, L.L.C., Carol Stream, Ill.

[21] Appl. No.: 09/057,902

[22] Filed: Apr. 9, 1998

Related U.S. Application Data

[63] Continuation-in-part of application No. 08/821,337, Mar. 20, 1997, which is a continuation-in-part of application No. 08/753,221, Nov. 21, 1996, Pat. No. 5,669,491.

[51] Int. Cl.$^7$ ................................................ B65D 85/57
[52] U.S. Cl. ........................................ 206/232; 206/308.1
[58] Field of Search ................................ 206/307, 307.1, 206/308.1, 308.3, 232, 309, 311, 312, 313, 387.13; 281/38, 45

[56] References Cited

U.S. PATENT DOCUMENTS

| | | |
|---|---|---|
| D. 369,106 | 4/1996 | Baker et al. . |
| 470,861 | 3/1892 | Chichester . |
| 2,345,230 | 3/1944 | Bender . |
| 2,435,856 | 3/1948 | Weingart . |
| 3,372,858 | 3/1968 | Brody . |
| 3,592,381 | 7/1971 | Brody . |
| 3,858,792 | 1/1975 | Volkert . |
| 4,488,737 | 12/1984 | Jacobs et al. . |
| 4,588,321 | 5/1986 | Egly . |
| 4,640,413 | 2/1987 | Kaplan et al. . |
| 4,709,812 | 12/1987 | Kosterka . |
| 4,793,477 | 12/1988 | Manning et al. . |
| 4,832,191 | 5/1989 | Gerver et al. . |
| 4,850,731 | 7/1989 | Youngs . |
| 4,852,740 | 8/1989 | Sellars et al. . |
| 4,905,831 | 3/1990 | Bagdis et al. . |
| 5,048,681 | 9/1991 | Henkel . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,170,889 | 12/1992 | Cue . |
| 5,193,681 | 3/1993 | Lieusay . |
| 5,207,717 | 5/1993 | Manning et al. . |
| 5,248,032 | 9/1993 | Sheu et al. . |
| 5,318,222 | 6/1994 | Bartlett . |
| 5,422,875 | 6/1995 | Bribach . |
| 5,460,265 | 10/1995 | Kiolbasa . |
| 5,462,160 | 10/1995 | Youngs . |
| 5,472,083 | 12/1995 | Robinson et al. . |
| 5,590,912 | 1/1997 | Stevens . |
| 5,669,491 | 9/1997 | Pettey . |
| 5,713,605 | 2/1998 | Pace et al. . |

FOREIGN PATENT DOCUMENTS 8702565  5/1989  Netherlands .

OTHER PUBLICATIONS

American On–Line Pocket Style CD–ROM folder booket 1996.

American On–Line folder–style CD–ROM folder 1997.

*Primary Examiner*—Jacob K. Ackun
*Attorney, Agent, or Firm*—Vedder Price Kaufman & Kammholz

[57] ABSTRACT

A compact or computer disc folder in the form of a booklet is disclosed which has a multi-page booklet portion held between two opposing panels of a cover portion. The front panel of the cover portion includes a disc-receiving pocket formed thereon in opposition to the booklet portion. The pocket includes two opposing flaps by which it is attached to the front panel and one of the flaps includes a notch that permits the flap to lie flat on the front panel without interfering with the booklet portion so that the folder will lie flat when closed. The pocket has a retention member disposed therein near the opening of the pocket that provides an interference edge upon which the disc catches during handling of the folder.

20 Claims, 4 Drawing Sheets

COMPACT DISC FOLDER BOOKLET WITH DISC RETENTION MEANS

REFERENCE TO RELATED APPLICATIONS

This application is a continuation in-part of prior application Ser. No. 08/821,337, filed Mar. 20, 1997 now pending, which is a continuation-in-part of prior application Ser. No. 08/753,221, filed Nov. 21, 1996 and now U.S. Pat. No. 5,669,491.

BACKGROUND OF THE INVENTION

The present invention relates generally to holders for compact discs and, more particularly, to compact or other type disc holders having printed information that accompanies the compact disc in which the holder has a means for retaining the disc in place within the holder.

Compact discs are used to store both digitally recorded music and computer programming information. The use of compact discs for computer programming has risen dramatically over the past few years and this use will likely increase because of the ability to store an enormous amount of data on a compact disc.

Audio compact discs, i.e., those containing prerecorded music, are typically stored in plastic containers known in the trade as "jewel boxes." Jewel boxes utilize front and rear plastic panels that are hinged together along adjacent edges. Although the jewel box is an effective storage device for compact discs, it is not recyclable and it is prone to breakage when sent through the mail.

Furthermore, jewel boxes are bulky compared to the thin compact disc stored therein. Manufacturing costs for these jewel box are high. The plastic jewel box is not easily printed on and any printed information accompanying the compact disc is enclosed in the box and positioned to show through the jewel box. As such, the manufacturing expense includes not only the plastic, molding and assembly costs for the jewel box but also the printing and paper costs for the inserts. The size of the jewel box limits the amount of printed matter that can accompany the compact disc. Small information booklets are either enclosed in the jewel box or held within a recess on the back of the jewel box. Removal of these booklets is awkward.

There have been attempts to provide compact disc holders that overcome the disadvantages of the jewel box. These holders are formed from paper, such as those disclosed in U.S. Pat. No. 5,085,318. Although compact, this compact disc holder provides little room for printed information and any such information must be printed on the front and back covers only. U.S. Pat. No. 5,154,284 discloses a compact disc holder that uses one large, single sheet of paper that is folded accordion-style in a map-like fashion for storage within the CD holder. Opening and refolding the printed material is awkward and the number of folds increases the cost of the holder.

Applicant's prior patent, U.S. Pat. No. 5,669,491, assigned to the assignee of the present invention, provides a suitable folder booklet that holds a compact disc or CD-Rom and also accommodates a multi-page booklet between two panels of an outer cover. However, it has been noted that the disc accommodated in this type of folder sometimes tend to work loose from the folder pocket.

The present invention is directed to a compact disc folder which overcomes the disadvantages of the aforementioned prior art and which better retains the disc within the pocket portion to the folder.

Accordingly, it is a general object of the present invention to provide a compact disc folder in the form of a booklet having distinct cover and booklet portions and which retains a compact disc in an internal pocket as well as printed text or instructions.

Yet another object of the present invention is to provide a folder for a compact or other type of disc wherein the folder takes the form of a booklet having a relatively rigid cover portion that encloses a disc-receiving pocket and a text portion having multiple pages, the pages being integrated into the booklet and attached to the cover portion thereof, the cover portion having a retention member disposed therein within the disc-receiving pocket to retain the disc therein.

SUMMARY OF THE INVENTION

The present invention is directed to a compact disc folder having a cover portion made from a paperboard blank having distinct front and rear panels interconnected by a vertical foldline. A pocket is formed on an interior surface of the front panel and overlies, when the folder is closed, a multiple page booklet portion held between the front and rear panels. The pages of the booklet portion have centerlines that are aligned with the first foldline of the folder. The pocket has a retention means associated therewith that serves to retain the disc therewithin.

In another aspect of the present invention, the folder includes a pocket panel attached to the front panel along a second foldline arranged generally perpendicular to the first foldline. The pocket panel is attached to the front panel by way of attachment flaps which are glued to the front panel along opposing side edges so that the pocket panel overlies the front panel. The flaps are of a length less than a corresponding length of the front panel side edges they are attached to so that the pocket lies flat upon the front panel and doesn't bulge upwardly to cause interference with closing of the folder. The pocket includes a retention member that is formed as part of one of the panels of the folder and which extends at least partially across the opening of the pocket proximate to the opening thereof.

In still another aspect of the present invention, at least one of the flaps includes a notch formed between it and the front and rear panels of the cover portion. This notch permits the one flap to be folded upon the pocket panel along a line that is offset from the first foldline of the cover portion, thereby also ensuring that the folder as a whole will lie flat when in a closed position and also ensuring that the pocket does not interfere with the attachment of the booklet pages to the cover portion. The retention member is preferably formed as a flap that is attached to an edge of the front panel and is folded upon the front panel in opposition to the pocket panel. The retention member extends along the front panel of the folder and partially extends into the pocket to create, in effect, a ledge that opposes the perimeter of any disc present in the folder pocket.

These and other objects, features and advantages of the present invention will be clearly understood through consideration of the following detailed description.

BRIEF DESCRIPTION OF THE DRAWINGS

In the course of the following detailed description, reference will be frequently made to the accompanying drawings in which.

DETAILED DESCRIPTION OF THE INVENTION

Figure 1:
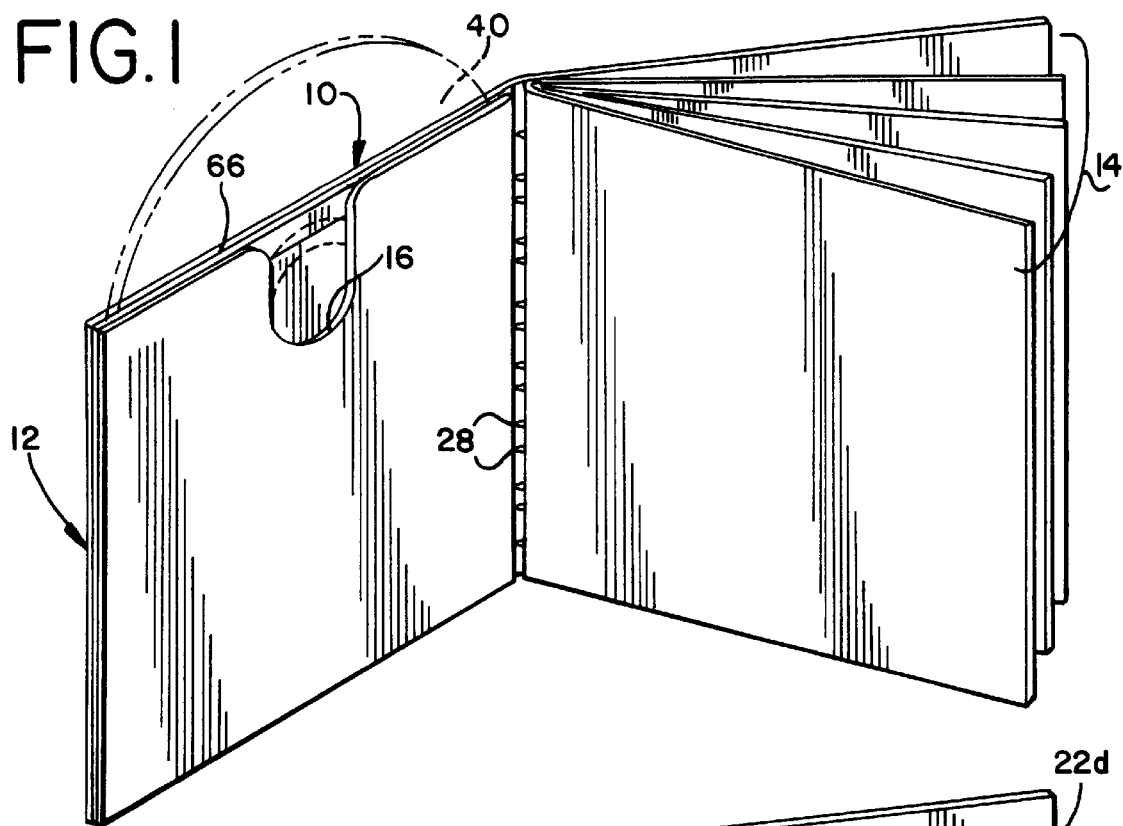
FIG. 1 is a perspective view of a disc folder constructed in accordance with the principles of the present invention and with a disc shown in phantom partially with the disc-receiving pocket of the folder.

Referring to FIG. 1, a compact disc folder constructed in accordance with the principles of the present invention is illustrated generally at 10. The folder 10 takes the form of a booklet and includes an outer cover portion 12, an internal multiple page portion 14 and a compact disc-receiving pocket 16. The cover portion 12 may be easily formed from a single blank 20 of paperboard or another relatively rigid material. (FIG. 4.)

Figure 2:
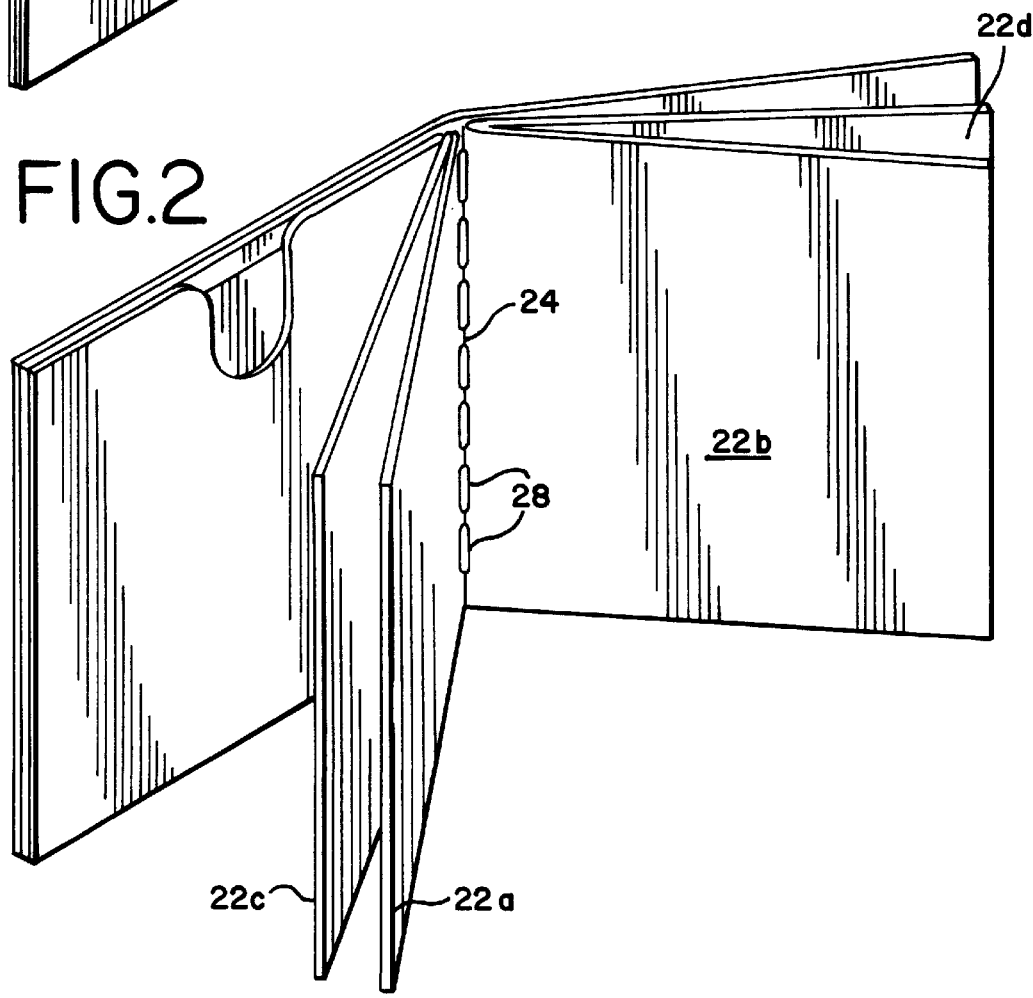
FIG. 2 is the same view as FIG. 1, illustrating the booklet portion thereof in an open position.
Figure 3:
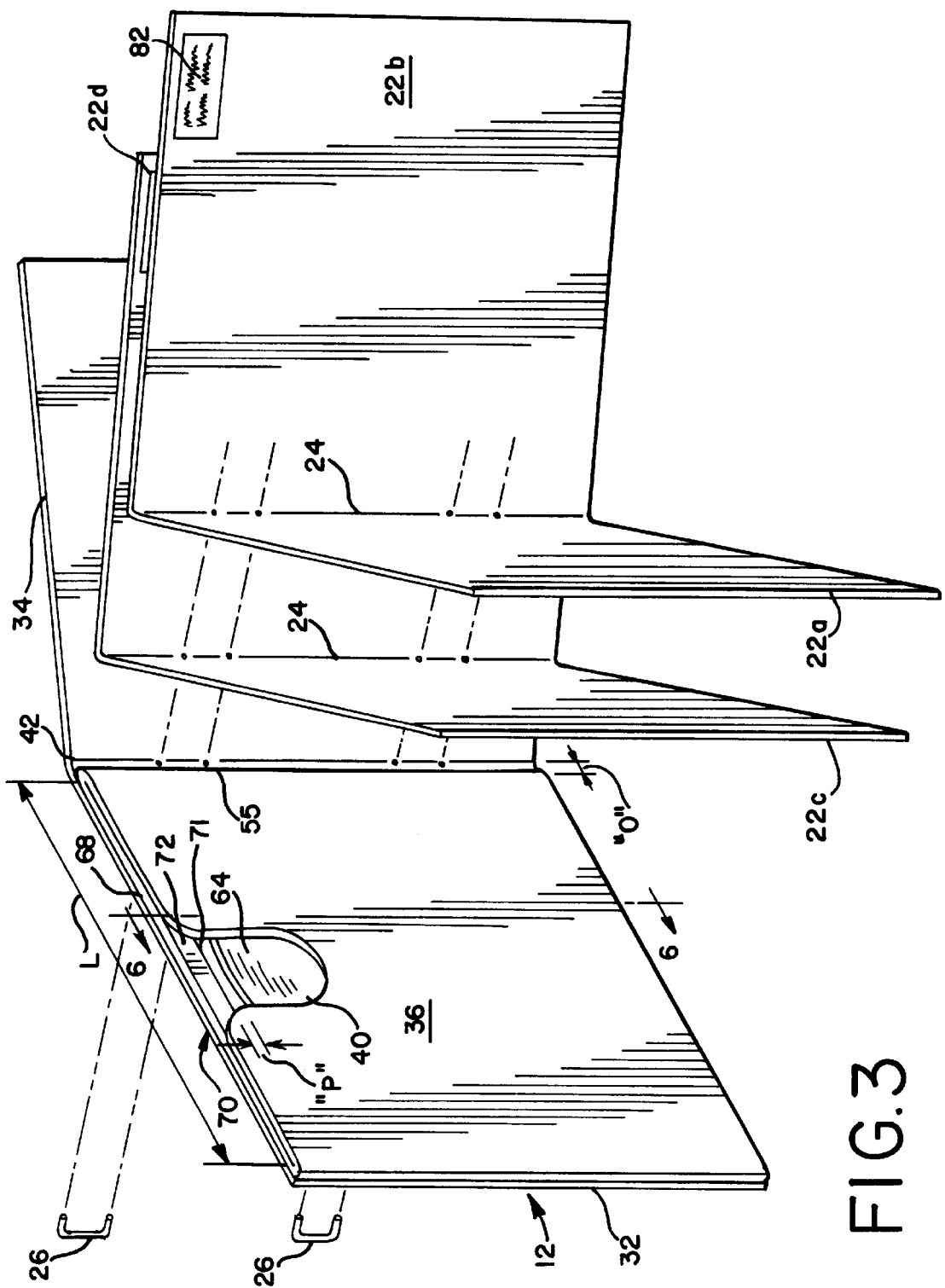
FIG. 3 is an exploded view of the disc folder of FIG. 1.

The page portion 14 of the folder 10 includes multiple pages 22a, 22b, 22c & 22d that are folded around a central, common foldline 24 thereof. The page portion 14 preferably includes multiple pages in groups of two pages, such as 22a & 22b and 22c & 22d. Any number of pages may be used in constructing the page portion 14. The page portion 14 may be attached to the cover portion 12 of the folder by any suitable means, such as by staples 26, as illustrated in FIG. 3, or by stitching 28, as illustrated in FIGS. 1 & 2.

Figure 4:
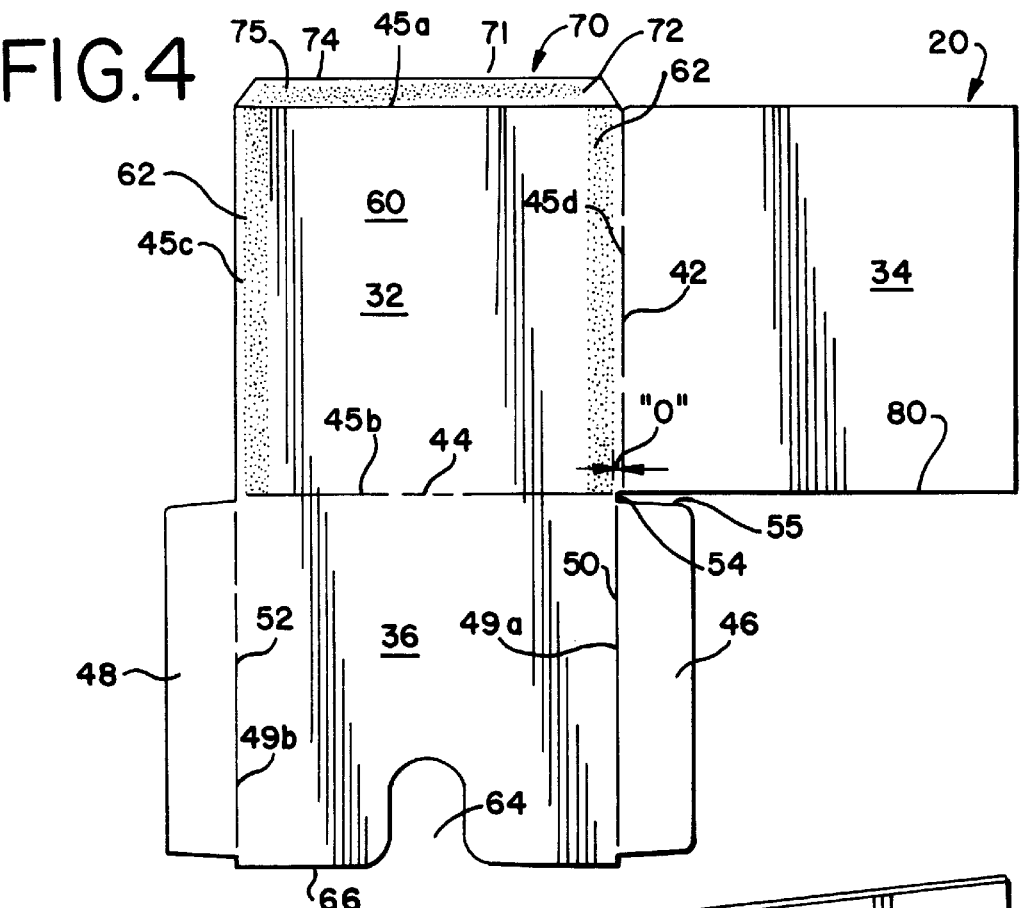
FIG. 4 is a plan view of a blank used in constructing the cover portion of the disc folder of FIG. 1.
Figure 5:
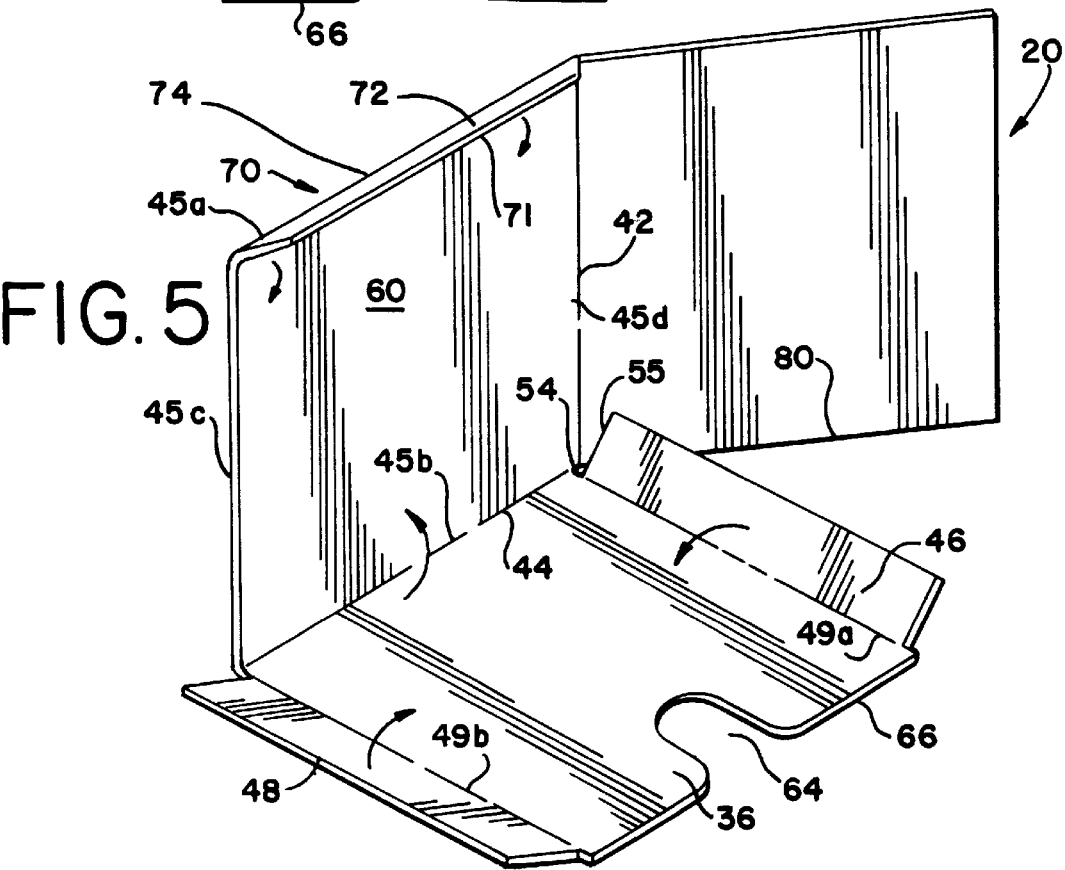
FIG. 5 is a perspective view of the blank of FIG. 4 in a partially-folded condition, illustrating the initial steps in constructing the cover portion thereof.

Turning now to the specific details of the cover portion 12, and with particular reference to FIGS. 4 & 5, it can be seen that the cover portion 12 is formed from a single blank 20. The cover portion 12 includes a front panel 32 defined thereon which serves as the cover of the folder 10, a rear panel 34 defined thereon which serves as the back of the folder 10 and an interior pocket panel 36 defined thereon which serves to form the disc-receiving pocket 16 that holds the compact disc 40, shown in phantom, therein.

The front panel 32 and the rear panel 34 of the folder 10 are interconnected to each other along common opposing edges that meet at an intervening foldline 42 of the folder 10. This first foldline 42 has a vertical orientation when the folder 10 is in an upright position such as illustrated in FIGS. 1–3. The interior panel 36 of the folder 10 is interconnected to the front panel 32 along common opposing edges that meet at an intervening second foldline 44 that assumes a horizontal orientation when the folder 10 is in its upright position.

The second foldline 44, as indicated in the drawing Figures, is angularly offset from the first foldline 42 and is preferably generally perpendicular thereto. The front panel 32 has two pairs of side edges 45a–45d that define its dimensions and extent. Two of these side edges 45a, 45b are located along the top and bottom edges of the front panel 32, while the remaining two side edges 45c, 45d define the sides of the front panel 32 and interconnect the top and bottom side edges 45a, 45b together.

The interior panel 36 that forms the pocket 16 in cooperation with the front panel 32 of the folder 10 includes two attachment panels, or flaps 46, 48 that are interconnected to the interior panel 36 along two opposing side edges 49a, 49b thereof. The flaps 46, 48 are separated from the interior panel 36 by intervening third and fourth foldlines 50, 52 that extend generally parallel to the foldline 42.

It has been found that in disc folders, one problem occurs: the discs 40 may come loose from and exit their associated pockets 16. This problem may be caused by rough handling of the folder or a general looseness of the disc pocket 16, or even other causes and factors. The present invention is therefore directed to a disc folder 10 with disc retention means 70 disposed it the disc pocket 16 that provides an interference or catching edge 71 that is interposed between the disc 40 and the disc pocket opening 68. As seen in FIG. 3, the retention means 70 includes an elongated strip, or panel, 72 that extend substantially the entire length L of the disc pocket opening 68.

Figure 6:
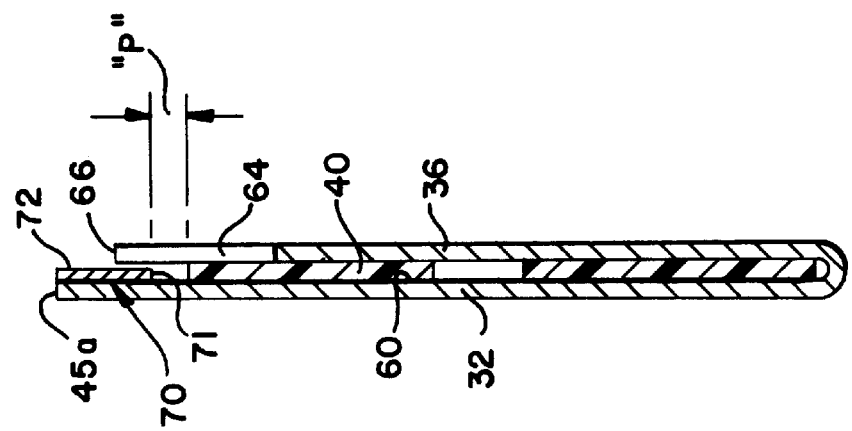
FIG. 6 is a sectional view of the disc folder of FIG. 3, taken along lines 6—6 thereof; and, FIG. 7 is a plan view of a blank illustrating an alternative means of forming the retention means on the cover portion of the disc folder of FIG. 1.

The interference strip 72 has a length sufficient that it will oppose and interfere with the other edge outer edge 41 of the disc 40. In this regard, it is preferred as illustrated in FIG. 3, that the strip 72 has a width that is just slightly less than the distance between the disc outer edge 41 and the top edge 45 of the cover portion front panel 32. This difference defies a small gap P between the strip edge 71 and the disc outer edge 71. (FIGS. 3 & 6.)

Importantly, the third foldline 50 is slightly offset from the foldline 42 that separates the front and rear panels 32, 34. This offset is indicated at "O" in FIG. 4. The third foldline 50 defines the right side edge 54 of the interior panel 36 and of the disc-receiving pocket 16. The offset keeps the right side edge 49a of the pocket away from the center of the folder 10 and away from the foldline 42 to permit alignment of the page centerlines 24 with the foldline 42. This offset also permits the folder to lay substantially flat when in a closed, folded position, wherein the front panel is folded upon the rear panel 34 with the pages 22a–22d held therebetween. The retention strip 72 may also have a length that matches this offset. (FIG. 4.)

In order to facilitate assembly of the pocket 16, at least one flap 50, and preferably both flaps 50, 52 have lengths that are less than the lengths of the side edges 49a, 49b of the interior panel 36. This dimensional relationship is preferably accomplished for the one flap 50 by way of a notch 54 interposed between the end 55 of the flap 50 and the bottom side edge 45b of the front panel 32 and the bottom side edge 80 of the rear panel 34. The notch 54 can be seen to terminate past the first foldline 42 and adjacent the front panel 32 along the bottom side edge 45b thereof. The notch further terminates at the third foldline 50 to ensure that the offset "O" is not compromised.

Adhesive is used to attach the flaps 50, 52 to the inner surface 60 of the front panel 36. The adhesive is preferably a permanent adhesive and is applied to either the front panel inner surface 60 in strips or beads 62, as illustrated, or it may be applied to the flaps 50, 52 themselves. The interior panel may further include a cutout 64 extending from one side edge 66 thereof which lies adjacent the opening 68 of the pocket 16. This cutout 64 extends inwardly a sufficient extent top permit a user to reliably grab hold of the compact disc 40 when it is retained within the pocket 16.

With respect to the disc retention means 70, the retention strip 71 may be formed as part of the folder blank 20. As illustrated best in FIG. 4, the strip 71 may be formed as a panel or flap extension 74 of the cover portion front panel 32 along the top edge 45a thereof. It may then be folded along a foldline that coincides with the top edge 45a of the front panel 32 as shown in FIG. 5. An adhesive 75 may be applied to either the inner surface of the strip 71 or the front panel inner surface 60.

In assembling the folders 10 of the present invention, the blank 20 may be die-cut from a sheet of paperboard, and the flaps 50, 52 folded about their respective foldlines 49a, 49b as illustrated in FIG. 5. The interior panel 36 is thereupon folded onto the front panel 32 around foldline 44. The page portions 14 are then attached to the cover portion 12 by saddle stitching, stapling or any other suitable means, such as gluing along the foldline 42. This construction permits the pages to be numbered with individual serial numbers in designated areas 20 for promotional and ordering purposes during the printing of the pages 22 prior to assembly into the cover portion 12.

Figure 7:
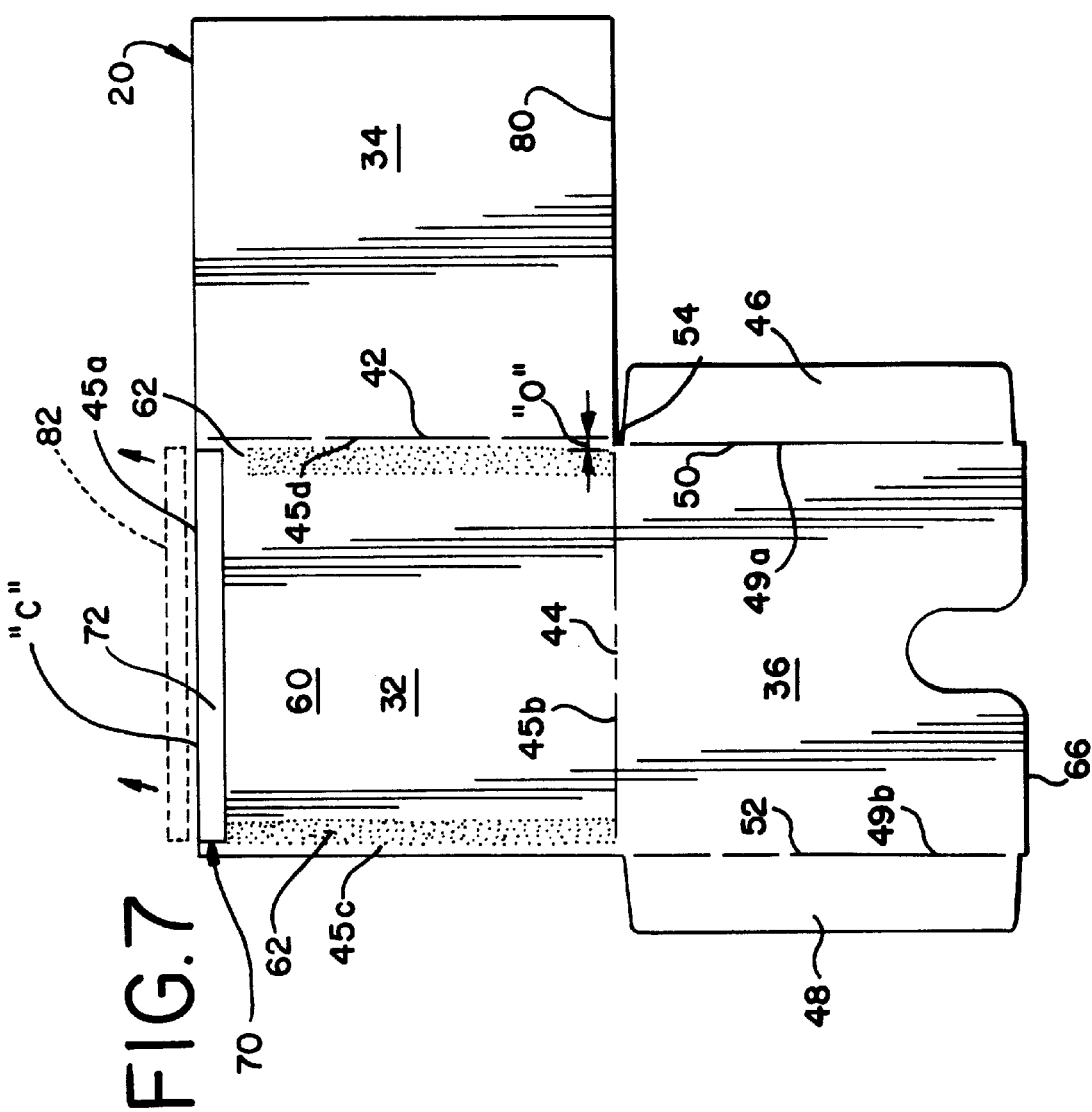

As mentioned above, the retention strip 72 may be formed integrally with the cover portion front panel 32 along the top edge 45a thereof. Alternatively, as illustrated best in FIG. 7, the retention strip 72 may be separately formed and applied to the cover portion front panel 32 near the top edge 45a of the inner surface 60 thereof. The length of the retention strip 72 is less that the width of the top edge 45a of the front panel 32 in order so the attachment flaps 46, 48 of the interior, or pocket panel 36 may be applied to the front panel 32 up to near the top edge thereof.

In yet another alternative construction, the retention strip 72 may be formed as part of the blank 20, and specifically as a flap or panel that is separated from the front panel 32 by an intervening foldline that is partially spaced from the front panel top edge 45a. The flap may then be folded along the top edge 45a and applied to the front panel 32 near the opening of the disc-receiving pocket 16. The blank 20 may then be cut, or trimmed, along the top edge 45a at C (FIG. 7) to separate an extending portion 82 thereof.

While the preferred embodiments of the invention have been shown and described, it will be apparent to those skilled in the art that changes and modifications may be made therein without departing from the spirit of the invention, the scope of which is defined by the appended claims. For example, it will be appreciated that the disc pocket and its associated retention strip may be formed on the rear panel of the cover portion. Also, the folder may include one or more intervening panels that separate the front and rear panels from each other.

What is claimed is:

1. A folder for a compact and other discs having a booklet shape, comprising: a cover portion and an internal booklet portion, the booklet portion having a plurality of pages and the cover portion enclosing the booklet pages, the cover portion including a front panel, a rear panel and an interior panel, the front and rear panels being interconnected together along by a first foldline and said front and interior panels being interconnected together along a second foldline, the first and second foldlines being arranged generally perpendicular to each other, said cover portion further including a pair of flaps formed on said interior panel and interconnected thereto by respective third and fourth foldlines disposed generally parallel to said first foldline and generally perpendicular to said second foldline, said flaps being interconnected to said front panel to define a disc-receiving pocket between said front and interior panels, the pocket being dimensioned to receive a disc therein, said booklet portion pages being attached to said cover portion along said first foldline, said cover portion including a retention member disposed thereon within said pocket near an opening of said disc-receiving pocket, the retention member having an edge along an opening of said pocket for retaining a disc in said disc-receiving pocket.

2. The disc folder as defined in claim 1, wherein said retention member includes an elongated member disposed on said cover portion and which extends transverse with respect to said first foldline.

3. The disc folder as defined in claim 1, wherein said interior panel flaps and said retention member are interconnected to said front panel by an adhesive.

4. The disc folder as defined in claim 1, wherein said interior panel has two spaced-apart, horizontal left and right side edges and one of said flaps has a length less than a length of said interior panel right side edge and therein said retention member has a length less than a length of a top edge of front panel.

5. The disc folder as defined in claim 1, wherein said cover portion is formed from a single paperboard blank.

6. The disc folder as defined in claim 5, wherein said blank includes a notch formed between one of said interior panel flaps and said rear panel of said blank.

7. The disc folder as defined in claim 6, wherein said notch extends past said rear panel of said blank and adjacent said front panel of said blank.

8. The disc folder as defined in claim 1, wherein said front panel has generally parallel, vertical left and right side edges and horizontal top and bottom side edges interconnecting said left and right side edges, said folder pocket being disposed on an interior surface of said front panel and said interior panel flaps being connected to said front panel interior surface generally along said front panel left and right side edges, and said fourth foldline is adjacent said front panel left side edge and said third foldline is spaced apart from said first foldline, said retention member including a retention flap disposed on said front panel in opposition to said interior panel and adjacent said front panel top edge, said interior panel overlying a portion of said retention flap.

9. The disc folder as defined in claim 1, folder further including a notch interposed between said interior panel flap and said front and rear panels, the notch terminating at said third foldline of said interior panel.

10. The disc folder as defined in claim 1, wherein said retention member is integrally formed with said folder cover portion.

11. A disc folder for holding a compact disc and printed material accompanying the compact disc, the folder having a pocket that receives the compact disc, said folder comprising: a unitary cover portion, the cover portion having at least a front panel, a back panel and an interior panel formed together on a paperboard blank, the interior panel being interconnected to one of said front and rear panels along common horizontal side edges thereof, said folder including at least one first intervening foldline interposed between said front and rear panels and a second intervening foldline interposed between said interior and one of said front and rear panels, said first and second foldlines being angularly offset from each other, said interior panel being attached to said one of said front and rear panels interior panel proximate to a pair of opposing vertical side edges thereof so that said interior panel overlies and faces said one of said front and rear panels to define an interior, disc-receiving pocket of said folder, the interior pocket having an opening to permit the compact disc to be inserted into and removed from said disc-receiving pocket, said folder further including a booklet containing printed information, the booklet having multiple pages folded around a common centerline, said booklet being interconnected to said folder at said first foldline so that said booklet is retained between said front and rear panels of said folder, said folder further including a disc retention member disposed in said interior pocket proximate to said opening thereof, said dis-retention member including an elongated, interference edge overlying said front panel and interposed between said front and interior panels, the edge rising up from said front panel and facing into said pocket.

12. The folder as defined in claim 11, wherein said disc-retention member includes a flap panel disposed adjacent to and extending from said one of said front and rear panels, said flap panel being separated from said one of said front and rear panels by an intervening flap panel foldline and said flap panel being folded around said intervening flap panel foldline onto said one of said front and rear panels.

13. The folder as defined in claim 11, wherein said booklet is interconnected to said cover portion by saddle-stitching.

14. The folder as defined in claim 11, wherein said booklet is interconnected to said cover portion by staples.

15. The folder as defined in claim 11, wherein said one of said interior panel includes two attachment flaps that are adhesively connected to said front panel and one of said two attachment flaps is separated from said rear panel and partially separated from said front panel by a notch.

16. The folder as defined in claim 15, wherein said notch terminates generally adjacent said third foldline.

17. The folder as defined in claim 11, wherein said dis-retention member is adhesively attached to said folder cover portion.

18. The folder as defined in claim 11, wherein said disc retention member includes an elongated strip disposed on said folder cover portion underlying said interior panel.

19. The folder as defined in claim 18, wherein said elongated strip is adhesively attached to said folder cover portion.

20. A folder booklet for a compact and other discs having a booklet shape, the folder booklet comprising: a cover portion and an internal booklet portion, the booklet portion having a plurality of pages and the cover portion enclosing the booklet pages, the cover portion including distinct front, rear and interior panels joined together, the front and rear panels being separated from each other by a first foldline and said front and interior panels being separated from each other by a second foldline, the first and second foldlines being offset from each other, said interior panel being interconnected to said cover portion along at least two distinct edges of said interior panel to thereby define a pocket between said cover portion and said interior panel that is dimensioned to receive a disc therein, said booklet portion pages being attached to said cover portion along said first foldline, said pocket including an elongated edge member associated therewith disposed within said pocket on said cover portion and extending along an opening of said pocket, the edge member having a raised edge that is raised with respect to said cover portion and which faces into said pocket, said edge providing an interference edge for contacting an opposing edge of said disc to thereby retain said disc in said pocket.

* * * * *